(12) United States Patent
Pathan et al.

(10) Patent No.: US 12,355,675 B1
(45) Date of Patent: Jul. 8, 2025

(54) TECHNIQUES FOR UPDATING RESOURCE PREDICTIONS AND RESOURCE ALLOCATIONS

(71) Applicant: Amazon Technologies, Inc., Seattle, WA (US)

(72) Inventors: Sharmin Pathan, Bellevue, WA (US); Dmitriy Belyi, Austin, TX (US); Ivan Borges Oliveira, Bellevue, WA (US); Ravikanth Kundurthi, Sammamish, WA (US); Daniel Thomas Meiller, Kirkland, WA (US); Pradeep Chowdary Mandava, Sammamish, WA (US); Burak Karacik, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/367,096

(22) Filed: Sep. 12, 2023

(51) Int. Cl.
| G06F 15/16 | (2006.01) |
| G06F 9/54 | (2006.01) |
| H04L 29/06 | (2006.01) |
| H04L 47/70 | (2022.01) |
| H04L 47/762 | (2022.01) |
| H04L 47/80 | (2022.01) |

(52) U.S. Cl.
CPC .......... *H04L 47/762* (2013.01); *H04L 47/801* (2013.01); *H04L 47/822* (2013.01)

(58) Field of Classification Search
CPC .... H04L 47/762; H04L 47/801; H04L 47/822
USPC ....................................................... 709/226
See application file for complete search history.

(56) References Cited

U.S. PATENT DOCUMENTS

| 10,026,070 | B2* | 7/2018 | Thorpe | G06Q 10/0631 |
| 11,502,971 | B1* | 11/2022 | Griffin | H04L 47/803 |
| 2015/0312169 | A1* | 10/2015 | Klots | H04L 41/5022 709/226 |
| 2015/0347907 | A1* | 12/2015 | Mathew | H04L 67/10 706/12 |
| 2016/0021025 | A1* | 1/2016 | Patel | H04L 47/83 370/329 |
| 2016/0197848 | A1* | 7/2016 | Bhide | H04L 47/801 709/224 |
| 2018/0024860 | A1* | 1/2018 | Balle | H04L 43/0817 |
| 2020/0034208 | A1* | 1/2020 | Wray | H04L 47/125 |
| 2022/0329539 | A1* | 10/2022 | Kim | H04L 41/147 |
| 2022/0400086 | A1* | 12/2022 | Nandy | H04L 47/805 |

(Continued)

*Primary Examiner* — Hamza N Algibhah
(74) *Attorney, Agent, or Firm* — Kilpatrick Townsend & Stockton LLP

(57) ABSTRACT

Techniques for allocating resources and generating resource allocation instructions are described herein. A model can generate a historical error for resources of a facility based on a first set of predicted resource imbalances and historical data for resources imbalances of the facility for a first set of previous time periods. The model can receive a second predicted resource imbalance for the resources of the facility associated with a first future time period. The model can receive real-time signals for states of the resources of the facility associated with a present time period. The model can generate an adjusted resource prediction for the resources of the facility based at least in part on the historical error, the second predicted resource imbalance, and the real-time resource signals. The adjusted resource prediction can be associated with the first future time period.

20 Claims, 6 Drawing Sheets

(56) References Cited

U.S. PATENT DOCUMENTS

| | | | |
|---|---|---|---|
| 2023/0315537 A1* | 10/2023 | Samareh Abolhasani | ............... G06F 11/3438 718/104 |
| 2024/0160493 A1* | 5/2024 | Hamze | ............... G06F 11/3476 |
| 2024/0223511 A1* | 7/2024 | Sumner | ............... H04L 47/808 |

* cited by examiner

TECHNIQUES FOR UPDATING RESOURCE PREDICTIONS AND RESOURCE ALLOCATIONS

BACKGROUND

Allocating resources across a network of facilities can be complex. Predicting resource needs can enable dynamic allocation of resources to enable each facility of the network to have necessary resources and to reroute resources away from facilities with lower needs to facilities with higher needs. Accurate resource predictions can enable more accurate resource allocation.

BRIEF DESCRIPTION OF THE DRAWINGS

Various embodiments in accordance with the present disclosure will be described with reference to the drawings, in which.

DETAILED DESCRIPTION

Figure 1:
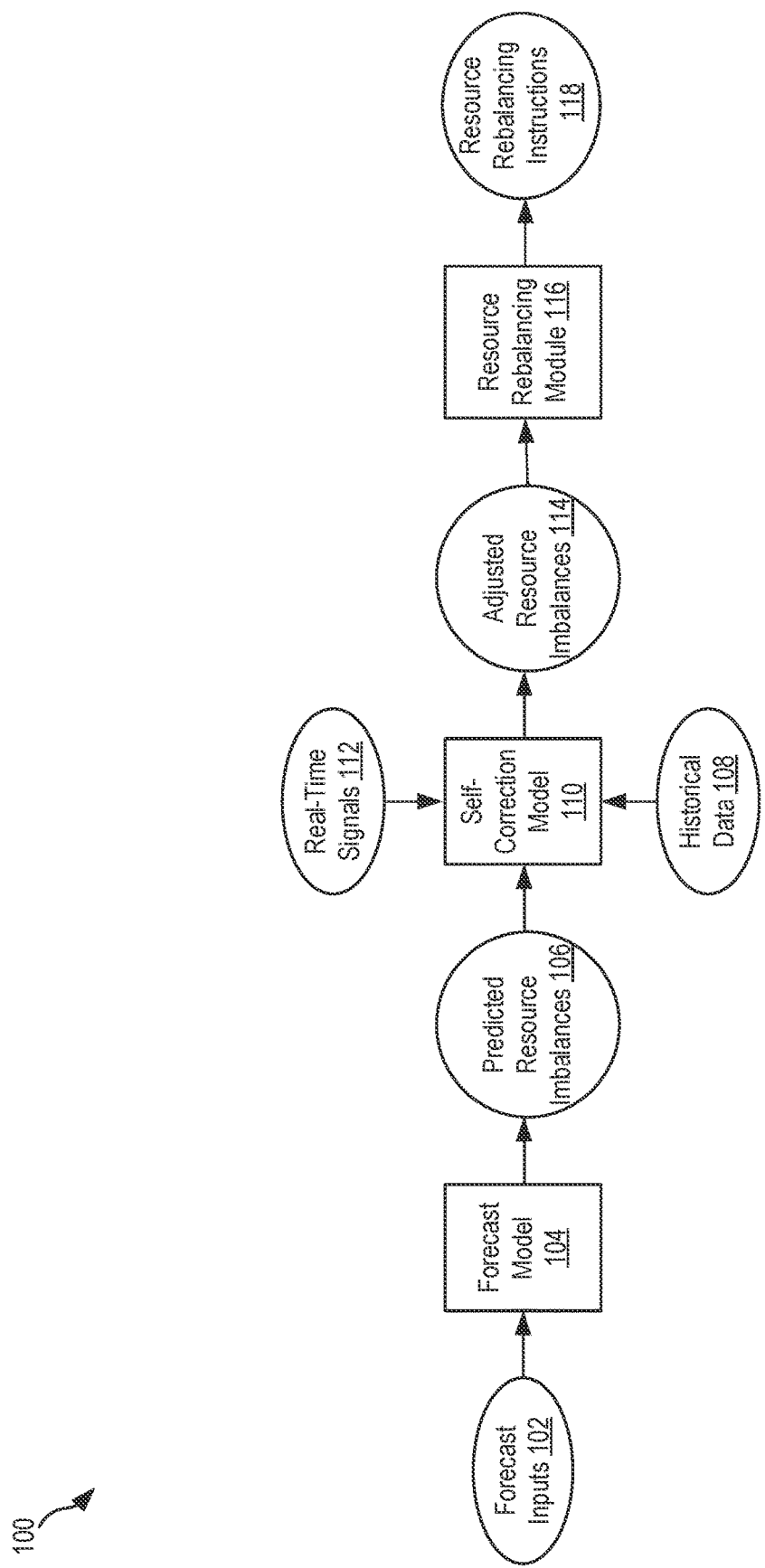
FIG. 1 illustrates a block diagram for resource allocation, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples of the present disclosure are directed to, among other things, methods, systems, devices, and computer-readable storage media relating allocating resources across a network of facilities. In a network of facilities, a resource management system for managing the allocation of resources across the network of facilities can be complex. Resources can include types of equipment such as trucks, containers, and trailers, as well as other types of resources. However, a demand and supply flow resource management system may not be as adept in accounting for variability introduced by operational and executional disruptions when predicting resource allocation. The inability to accurately and/or precisely plan resource allocations can lead to the need for manual interventions to allocate and reallocate resources. As described herein, by using one or more machine learning models, both the resource needs and the resources available for each facility in the network of facilities can be predicted and/or forecast at specific future time intervals. The machine learning model can account for the shortcomings of using raw planning data from the demand and supply flow resource management system and account for late/early departures and arrivals, cancellations, ad hoc changes to plans, variable load and unload times, historical and real-time execution trends, and the like.

For example, a first machine learning model can generate predicted resource imbalances against planned loads while incorporating volume forecast information. Predicted resource imbalances can also be referred to as resource predictions. Volume forecast information can be resource volume that is scheduled to move between facilities. The first machine learning model also uses the geographical attributes of a facility, the type of a facility, and time-series information regarding time of day and day of week. The predicted resource imbalances generated by the first machine learning model can be used to generate a raw prediction for resource imbalances at facilities.

A second machine learning model can generate adjusted resource imbalances from the raw prediction that account for the historical errors in previous generated resource predictions. The second machine learning model can determine historical errors for the predicted resource imbalances of the first machine learning model by comparing historical predicted resource imbalances to the actual historical data regarding resource imbalances. By comparing historical predicted resource imbalances to historical resource data to generate adjusted resource imbalances, the second machine learning model can more accurately predict a future allocation of resources.

The second machine learning model can also use real-time signals to generate the adjusted resource imbalances. The real-time signals can give insight into the health of a facility by indicating that resources are moving to and from the facilities and/or resources that become available for facilities. The real-time signals can also be used to account for variability from the planned loads and volume forecasts used to generate the predicted resource imbalances of the first machine learning model.

This future allocation of resources can be used to determine resource reallocation needs for the network of facilities and automatically generate resource rebalancing instructions. Resource rebalancing instructions can be used to move resources among the network of facilities to meet resource needs.

Overall, the techniques described herein relating to resource allocation prediction can result in more accurate and/or more precise predictions for resource imbalances in both short time horizons and long-time horizons. The techniques described herein can also result in predicting and handling variability from planned loads due to unanticipated disruptions and/or deviations from planned usage of resources. The techniques described herein can also reduce overall adjustment rates for reallocating resources and improve automation rates for reallocating resources such that manual reallocations become less frequent. The techniques described herein can also enable the generation of reallocation instructions that stay consistent over time and do not change as frequently due to unanticipated disruptions and/or deviations.

Turning now to a particular example, a resource prediction generated by the first machine learning model at or about at 8:00 a.m. on Tuesday, August $8^{th}$ can predict equipment (such as trailers) at facility A during a one-hour time interval at 8:00 a.m. on Wednesday, August $9^{th}$, about twenty-four hours from the time of the generation of the prediction. 8:00 a.m. on Tuesday, August $8^{th}$ can be considered the generation time for the prediction and 8:00 a.m. on Wednesday, August $9^{th}$ can be considered the prediction time for the prediction. The resource prediction can indicate that ten trailers are inbound to facility A, eight trailers are outbound from facility A, four trailers inbound to facility A will finish unloading, and three trailers outbound from facility A will start loading during the one-hour time interval. These resource predictions can be used to generate new data such as total resource imbalance and empty resource imbalance. Total equipment imbalance can be the difference between the inbound equipment and the outbound equipment. In some examples such as this example, total resource imbalance can be referred to as total equipment imbalance and/or total trailer imbalance. In this example, the total equipment imbalance is two trailers indicating that during the time interval there will be two additional trailers at facility A as compared to the previous time interval.

Likewise, in some examples such as this example, empty resource imbalance can be empty equipment imbalance and/or empty trailer imbalance. Empty equipment imbalance can be the difference between trailers inbound to facility A that have finished unloading and trailers outbound from facility A that have started loading. In this example, the empty equipment imbalance is one trailer indicating that during the time interval there will be one additional empty trailer at facility A as compared to the previous time interval.

The resource prediction can then be error-corrected by the second machine learning model. The second machine learning model can use both historical data and real-time signals to generate the adjusted resource imbalances. The second machine learning model can determine historical errors for previous resource predictions (for example, the hourly resource predictions for the last two weeks) by comparing the previous resource predictions to the historical data of the past two weeks. An example historical error can be the difference between the predicted empty resource imbalance and the actual empty resource imbalance at facility A for a particular past time period, such as a one-hour time interval at 8:00 a.m. Wednesday August $2^{nd}$, about 144 hours (six full days) before the generation time of the prediction and about 168 hours (seven full days) before the prediction time of the prediction. The total historical error can be an average, median, or mean, of the difference between the previous resource predictions and the historical data of the particular past time period. The second machine learning model can use the historical errors to error-correct the resource prediction.

The second machine learning model can also use real-time signals to error-correct the resource prediction. The real-time signals can account for real-time variability from the planned loads and volume forecasts used to generate the resource predictions of the first machine learning model. The real-time signals can indicate that a real-time adjustment is needed to generate the adjusted resource imbalances from the resource prediction. The real-time signals can also indicate emerging new trends. The real-time signals can indicate that some or all historical errors may not apply when generating the adjusted resource imbalances.

The adjusted resource imbalances can be used by the resource management system to determine resource reallocation. For example, the updated resource prediction may show that facility A is predicted to have insufficient empty trailers to service predicted trailer need at a future time period. Once the resource management system has identified that resources need to be reallocated, the resource management system can identify how to reallocate resources. For example, the resource management system is able to identify trailers at other facilities that can be moved to facility A prior to the future time period.

Once the resource management system has identified how to reallocate resources, the resource management system can generate resource rebalancing instructions. For example, the resource management system can generate first instructions to a facility B (or a manager of facility B) that a trailer at facility B needs to be prepared to be picked up by a truck C to be moved to facility A. Similarly, the resource management system can generate second instructions to a driver D of truck C to go to facility B by a certain time period to pick up the trailer and take it to facility A.

Figure 5:
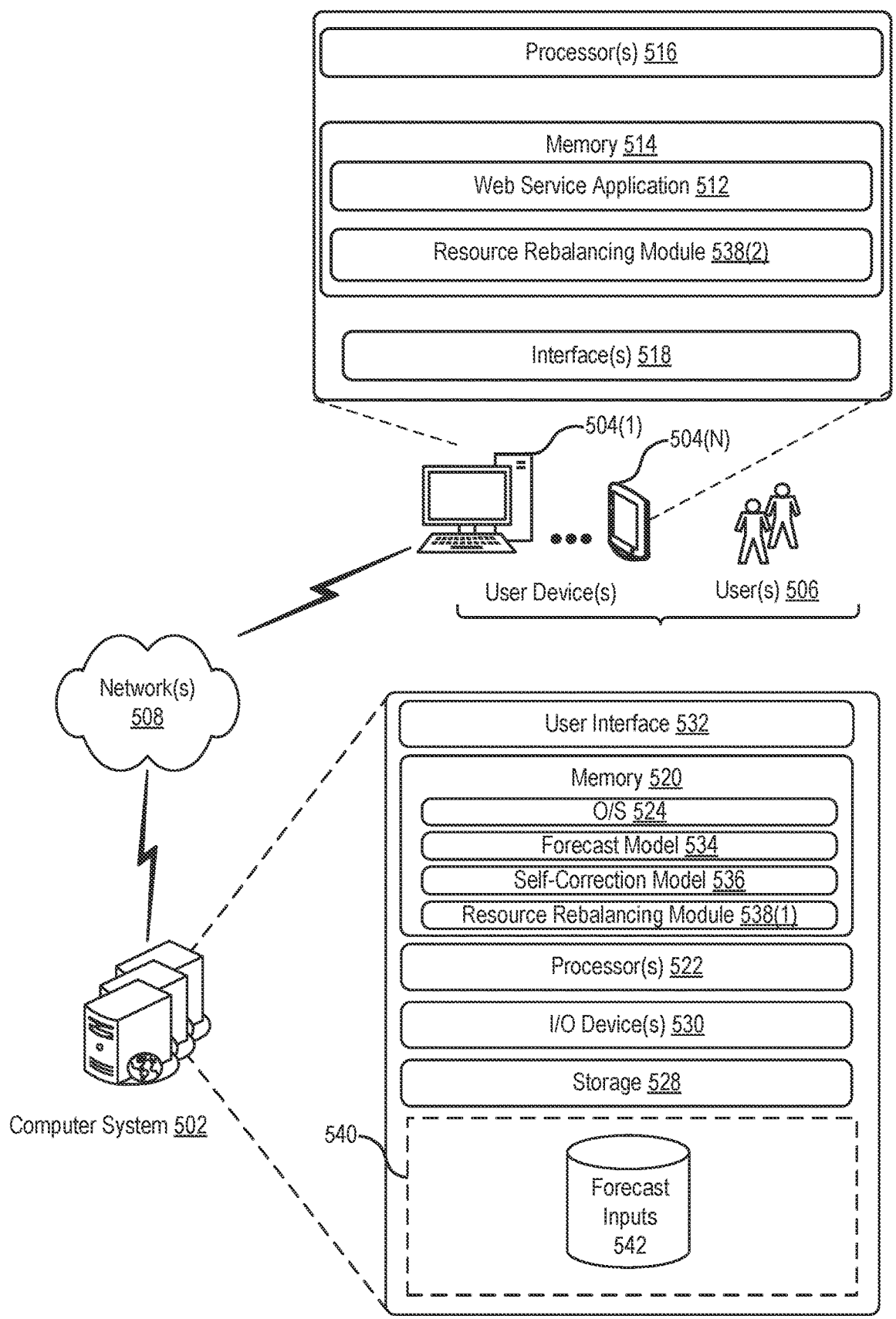
FIG. 5 illustrates an example schematic architecture for implementing techniques relating to resource management, according to at least one example.

FIG. 1 illustrates a block diagram 100 of resource allocation techniques described herein. At a high level, the forecast model 104 (for example, the first machine learning model described herein) can use forecast inputs 102 regarding resources at facilities in a network to generated predicted resource imbalances 106 at the facilities. These predicted resource imbalances can include resource imbalances at specific time intervals for a future time period. A self-correction model 110 (for example, the second machine learning model described herein) can use the predicted resource imbalances 106, historical data 108, and real-time signals 112 to error-correct the predicted resource imbalances 106 at the facilities. The error-corrected resource imbalances generated by the self-correction model 110 can be referred to as adjusted resource imbalances 114. As part of the error-correction, the self-correction model 110 can use real-time signals 112 to adjust the resource prediction based on more recent trends for resource imbalances at the facilities. Furthermore, the self-correction model 110 can use the historical data 108 to generate the adjusted resource imbalances 114 based on recent resource information and possible deviations from the planning information used to generate the predicted resource imbalances 106. A resource rebalancing module 116 can use the adjusted resource imbalances 114 to determine resource reallocation for efficient use of resources across facilities in the network. The resource rebalancing module 116 can then use the resource reallocation to generate resource rebalancing instructions 118 for directing the flow of resources. For example, resource rebalancing instructions 118 can include truck instructions regarding routes, timing, and the movement of resources and facility instructions regarding the emptying and filling of trailers and/or containers. The forecast model 104, the self-correction model 110, and the resource rebalancing module 116 can be embodied as part of a computer system 502 (FIG. 5).

The forecast model 104 can generate predicted resource imbalances 106 based on forecast inputs 102. In some examples, the forecast model 104 generates predicted resource imbalances 106 every hour. Forecast inputs 102 can include plans for resources and volume forecasts for resources. Plans for resources include plans for the use and movement of resources. For example, plans for resources can include planned loads such as full containers being moved on trailers by trucks. Other types of plans for resources can include the movement of empty containers on trailers by trucks, the movement of empty trailers by trucks, and the movement of trucks. Volume forecasts for resources can include the volume of resources that may need to be used at a specific time such as volume due to specific events or seasons as well as the volume of resources scheduled to move between facilities. For example, an annual sale (for example the holidays in December or back-to-school sales) may have a different volume forecast as compared non-sale seasons. Forecast inputs 102 can also include the geographical attributes of the yard facility such as the longitude and/or latitude of a facility. Forecast inputs can also include a type of facility. Types of facilities can include fulfillment centers, sort centers, delivery stations, and cross-docks. Fulfillment centers can be locations where orders of goods can be filled. Delivery stations can be locations where last-mile drivers can receive orders and then deliver orders. Sort centers can be locations where goods can be aggregated for shipping to fulfillment centers in a region. Cross-docks can be locations where trucks can meet to exchange goods and then depart to different destinations.

Other forecast inputs 102 can include time-series components that can be used in conjunction with plans for resources. Time-series components can include trailing daily executed resource counts of previous days prior to generation time. For example, daily executed resource counts can include daily executed equipment counts such as arrived containers, departed containers, loaded containers, unloaded containers, arrived trailers, departed trailers, trailers loaded with containers, empty trailers, arrived trucks, departed trucks, trucks with no trailers and no containers, trucks with trailers and containers, trucks with trailers but no containers, and the like. Trailing hourly executed resource counts can also be used in place of daily executed resource counts to provide hourly granularity to the time-series components of the forecast inputs 102.

Forecast inputs 102 can also include temporal features such as the forecast generation day of the week (for example, a forecast generation day of the week would be Thursday for a forecast generated on Thursday), forecast generation hour (for example, a forecast generation hour would be 8:00 a.m. for a forecast generated at 8:00 a.m.), and a forecast hour offset (for example, a forecast hour offset for 11:00 a.m. would be 3 hours for a forecast generated at 8:00 a.m. the same day). In some examples, the generation day of the week and the forecast generation hour can be modeled in two dimensions by using a sine and/or cosine transformation.

The forecast model 104 uses the forecast inputs 102 to generate predicted resource imbalances 106. These predicted resource imbalances can include resource information at specific time intervals for a future time period. Time intervals can be hourly time intervals, daily time intervals, or a combination of hourly time intervals and daily time intervals. For example, a resource prediction at 9:00 a.m. on January $23^{rd}$ can include resource imbalances at hourly time intervals for the next 168 hours (7 full days) and daily time intervals for the following two weeks. In some examples, the forecast model 104 can be trained to determine insights on how forecast inputs 102 can be used to generate the predicted resource imbalances 106.

The predicted resource imbalances 106 generated by the forecast model 104 can include a raw imbalance forecast that includes an arrived resource count, a departed resource count, a finished unloading resource count, and a started loading resource count. The information from the raw imbalance forecast can be used to generate a total resource imbalance and an empty resource imbalance as described herein. In some examples, the total equipment imbalance can be the difference between the inbound equipment and the outbound equipment. Empty equipment imbalance can be the difference between trailers inbound to a facility that have finished unloading and trailers outbound from the facility that have started loading. Both the predicted resource imbalances 106 and the raw imbalance forecast can be on a per facility basis.

Similar to the example above, a predicted resource imbalances 106 generated by the forecast model 104 at or about at 3:00 p.m. on Friday, March $3^{rd}$ can include a prediction for resources (such as trailers) at facility A during a one-hour time interval at 9:00 a.m. on Sunday, March $5^{th}$, about 42 hours from the time of the generation of the prediction. In this example, 3:00 p.m. on Friday, March $3^{rd}$ can be considered the generation time for the prediction and 9:00 a.m. on Sunday, March $5^{th}$ can be considered the prediction time for the prediction. In this example, the forecast generation day of the week is Sunday, the forecast generation hour is 3:00 p.m., and the forecast hour offset is 42. The predicted resource imbalances 106 can indicate that 12 trailers are inbound to facility A, 6 trailers are outbound from facility A, 5 trailers inbound to facility A will finish unloading, and 4 trailers outbound from facility A will start loading during the one-hour time interval. These resource predictions can be used to generate new data such as total resource imbalance and empty resource imbalance. Total equipment imbalance can be the difference between the inbound equipment and the outbound equipment. In some examples such as this example, total resource imbalance can be referred to as total equipment imbalance and/or total trailer imbalance. In this example, the total equipment imbalance is 6 trailers indicating that during the time interval there will be 6 additional trailers at facility A as compared to the previous time interval.

Likewise, in some examples such as this example, empty resource imbalance can be empty equipment imbalance and/or empty trailer imbalance. Empty equipment imbalance can be the difference between trailers inbound to facility A that have finished unloading and trailers outbound from facility A that have started loading. In this example, the empty equipment imbalance is 1 trailer indicating that during the time interval there will be 1 additional empty trailer at facility A as compared to the previous time interval.

In some examples, the resource reallocation techniques described here are trying to optimize the total resource imbalance and the empty resource imbalance for the various resources to be a positive value as close to 0 or 1 as possible.

This example refers to a single one-hour time interval, but as described herein the predicted resources imbalances 106 generated by the forecast model at or about 3:00 p.m. on Friday, March $3^{rd}$ can include resource imbalance predictions for hourly time intervals for multiple days and daily time intervals for multiple days. In some examples, the predicted resources imbalances 106 can include hourly time intervals for 48 hours and daily time intervals for the following 19 days.

The forecast model 104 can be a gradient-boosting tree based machine learning model. The forecast model 104 can be trained on a variety of information including example forecast inputs (for example, forecast inputs 102). In some examples, the forecast model 104 can be trained on previous weeks or months of forecast data. Forecast data can include the planned resources and volume forecasts for the previous weeks or months. The forecast data can also include the historical data for actual resource imbalances at facilities for the previous weeks or months (also referred to as trailing daily executed resource counts or trailing hourly executed resource counts). The trailing daily executed resource counts for any prior period can be used to train the forecast model 104. In some examples, the forecast model 104 can be trained on the previous sixteen weeks of forecast data. In some examples, the trailing daily executed resource counts for the most recent days (or hours) can be excluded. The most recent training daily executed resource counts may be inaccurate or not entirely settled at generation time. In some examples, the forecast model 104 can be trained on the previous sixteen weeks of forecast data excluding the most recent 48 hours. The forecast data can also include recently generated predicted resource imbalances 106. In some examples, the forecast data includes only one predicted resources imbalances 106, namely the most recently generated predicted resource imbalances. In some examples, the forecast data includes multiple predicted resources imbalances 106, for example the multiple predicted resources imbalances generated for a last time such as the previous two weeks or previous sixteen weeks. The forecast model 104 can be designed to develop insights regarding the forecast data used for training and apply those insights to new forecast inputs 102 at generation time (also referred to as run-time).

Once the forecast model 104 has generated predicted resource imbalances 106 for a facility, the predicted resource imbalances 106 for the facility can be subject to facility-level correction and network-level correction. Facility-level correction can calculate residuals from imbalance predictions to make bias correction at the facility level. Facility-level correction is applied based on accuracy of the imbalance predictions of the past. Facility-level correction can calculate the differences between historical data and predicted resource information to determine a root-mean-square based correction factor that can be applied to the predicted resource imbalances 106.

Network-level correction can be used to forecast inbound and outbound resources at the network level across multiple facilities. The predicted resource imbalances 106 can be scaled based on network-level total equipment counts and needs, as well as network-level stability. The network-level correction forecasts the total resource usage for the network and compares that to the sum total of facility-level predictions to create a scalar. For example, if the total inbound trailers for the network is predicted to be 200 trailers and the total outbound trailers is predicted to be 400 trailers, but the sum total of facility-level predictions of inbound trailers for the network is predicted to be 100 trailers and the total outbound trailers is predicted to be 100 trailers, then the scalar for inbound trailers is 2 and the scalar for outbound trailers is 4. These scalars can be applied to the predicted resource imbalances 106.

The predicted resource imbalances 106 can then be error-corrected by the self-correction model 110 to generate adjusted resource imbalances 114. In some examples, the error-correction model 110 generates adjusted resource imbalances 114 every hour. The self-correction model 110 uses both historical data 108 and real-time signals 112 to generate the adjusted resource imbalances. In some examples, the self-correction model 110 can be trained to determine insights on how historical data 108 and real-time signals 112 can be used to generate adjusted resource imbalances 114 from the predicted resource imbalances 106.

In some examples, the self-correction model 110 can generate historical errors by comparing previous predicted resource imbalances 106 to the historical data 108 for a previous time period to generate historical errors. The historical data 108 can be the actual resource counts for the previous time periods. The collection of historical errors for the previous time periods can then be used by the self-correction model 110 to calculate a total historical error.

Here is an example historical error for a particular time period that can be used by the self-correction model 110 to generate a total historical error for further use in generating the adjusted resource imbalances 114. This example relates to the above example predicted resource imbalances 106 generated at or about at 3:00 p.m. on Friday, March $3^{rd}$ which includes a prediction for resources (such as trailers) at facility A during a one-hour time interval at 9:00 a.m. on Sunday, March $5^{th}$, about 42 hours from the time of the generation of the prediction. As noted above, the predicted resource imbalances 106 generated at or about at 3:00 p.m. on Friday, March $3^{rd}$ includes the total equipment imbalance of 6 trailers and the empty equipment imbalance of 1 trailer at the prediction time of 9:00 a.m. on Sunday, March $5^{th}$. The self-correction model 110 can compare previous predictions for time periods prior to the generation time at 3:00 p.m. on Friday, March $3^{rd}$ and/or the prediction time at 9:00 a.m. on Sunday, March $5^{th}$ compared to historical data 108 at those previous times. For example, the self-correction model 110 can compare a previous prediction with a generation time of Sunday, February $25^{th}$ at 10:00 a.m. and a prediction time of Wednesday, March $1^{st}$ at 10:00 a.m. to the historical data 108 for Wednesday, March $1^{st}$ at 10:00 a.m. The previous prediction may have a total equipment imbalance of 3 trailers and an empty equipment imbalance of 2 trailers when the historical data 108 indicates that the actual total equipment imbalance was 2 trailers and the actual empty equipment imbalance was 2 trailers. This example demonstrates an example historical error that can be used by the self-correction model 110 to error-correct the predicted resource imbalances 106 to generate adjusted resource imbalances 114. The self-correction model 110 in this example can also compare a previous prediction for Wednesday, March $1^{st}$ at 9:00 a.m. to the historical data 108 for Wednesday, March $1^{st}$ at 9:00 a.m., a previous prediction for Wednesday, March $1^{st}$ at 8:00 a.m. to the historical data 108 for Wednesday, March $1^{st}$ at 8:00 a.m., and a previous prediction for Monday, February $27^{th}$ at 9:00 a.m. to the historical data 108 for Monday, February $27^{th}$ at 9:00 a.m., among others in order to identify a total historical error to use in error-correcting the predicted resource imbalances 106 to generate adjusted resource imbalances 114.

The self-correction model 110 can calculate the total historical error by identifying trends in the collection of historical errors compared to facility location, facility type, time-series components, and temporal features used to generate the predicted resource imbalances 106. As noted above, time-series components can include daily executed resource counts. Temporal features such as the forecast generation day of the week, forecast generation hour, and a forecast hour offset.

In some examples, the total historical error generated by the self-correction model 110 based on an average, median, mean, weighted averaged, or weighted mean of all the historical errors for a specific preceding time period (the differences between the previous resource predictions and the historical data of the particular past time period). In some examples, the total historical error can be based on an average, median, mean, weighted averaged, or weighted mean of a subset of the historical errors for a specific preceding time period. In some examples, the total historical error can be based on an average, median, mean, weighted averaged, or weighted mean of the historical errors for the same combination of particular time (for example, 10 a.m.) and day of week (for example, Thursday) in previous weeks or months. For example, the total historical error for a prediction time of Tuesday, May $22^{nd}$ at 8:00 a.m. can be generated based on the average, median, mean, weighted average, or weighted mean of all the historical errors on Tuesday, May $15^{th}$ at 8:00 a.m. and Tuesday, May $8^{th}$ at 8:00 a.m. In the example, where predicted resource imbalances 106 are generated hourly, there may be at least 48 different resource predictions related to both Tuesday, May $15^{th}$ at 8:00 a.m. and Tuesday, May $8^{th}$ at 8:00 a.m.

In some examples, the total historical error can be the difference between a particular resource prediction for the particular past time period and the historical data of the particular past time period. For example, the particular resource prediction for the particular past time period may have been generated in the preceding time period before the particular past time period such as the prediction generated an hour before.

The self-correction model 110 can use the total historical error to adjust the predicted resource imbalances 106 based on insights developed during training of the self-correction model 110. The self-correction model 110 can also use real-time signals 112, in addition to the total historical error, to generate the adjusted resource imbalances 114. The real-time signals 112 can give insight into the health of a facility by indicating that resources are presently moving to and from the facilities. The real-time signals 112 can also account for real-time variability from the planned loads and volume forecasts used to generate the resource predictions of the first machine learning model.

The self-correction model 110 can use the total historical error to adjust the predicted resource imbalances 106. The self-correction model 110 can also use real-time signals 112, in addition to the total historical error, to generate the adjusted resource imbalances 114. The real-time signals 112 can give insight into the health of a facility by indicating that resources are presently moving to and from the facilities. The real-time signals 112 can also account for real-time variability from the planned loads and volume forecasts used to generate the resource predictions of the forecast model 104.

Here is an example real-time signal used by the self-correction model 110 to calculate the adjusted resource imbalances 114. This example relates to the above example predicted resource imbalances 106 generated at or about at 3:00 p.m. on Friday, March $3^{rd}$ which includes a prediction for resources (such as trailers) at facility A during a one-hour time interval at 9:00 a.m. on Sunday, March $5^{th}$, about 42 hours from the time of the generation of the prediction. As noted above, the total equipment imbalance is 6 trailers and the empty equipment imbalance is 1 trailer. The self-correction model 110 can determine, based on the total historic error, that the error-corrected total equipment imbalance is 8 trailers and the error-corrected empty equipment imbalance is 4 trailers. However, the real-time signals 112 can indicate that there are currently 2 empty trailers at 3:00 p.m. on Friday, March $3^{rd}$ at the facility, which may be different than the predicted number of empty trailers used to generate the predicted resource imbalances 106. The self-correction model 110 can then use the actual real-time signals for the empty trailers at the facility to update the adjusted resource imbalances 114. Similarly, the real-time signals 112 can indicate that 4 trailers should be arriving at the facility within the near future. The self-correction model can then use the actual real-time signals for arriving trailers to update the adjusted resource imbalances 114.

In some examples, the real-time signals 112 can be used to generate a real-time adjustment to be used in generating the adjusted resource imbalances 114. In some examples, the real-time adjustment can be used to generate a real-time error. The real-time error can be related to a difference between the real-time signal for a particular resource or metric and the predicted resource imbalance 106 for each time period of the predicted resource imbalance 106 even if the time periods for the predicted resource imbalance 106 are future time periods.

In some examples, the real-time signals 112 can be used by the self-correction model 110 to determine that some or all historical errors may not apply to the adjusted resource imbalances 114. In some examples, the real-time signals 112 can be used by the self-correction model 110 to determine that new trends are emerging in real-time for the resources and associated metrics that need to be accounted for in the adjusted resource imbalances 114.

Other types of real-time signals 112 can relate to trailers. For example, real-time signals 112 can also include the number of inbound trailers that have arrive at a facility during a time period. Real-time signals 112 can include the number of outbound trailers that have departed from a facility during a time period. Real-time signals 112 can include the number of trailers that have finished unloading at a facility during a time period. Real-time signals 112 can include the number of trailers that have started loading at a facility during a time period.

Some real-time signals 112 can relate to containers. For example, real-time signals 112 can also include the number of inbound containers that have arrive at a facility during a time period. Real-time signals 112 can include the number of outbound containers that have departed from a facility during a time period. Real-time signals 112 can include the number of containers that have finished unloading at a facility during a time period. Real-time signals 112 can include the number of containers that have started loading at a facility during a time period.

Some real-time signals 112 can relate to activity within the facility. For example, real-time signals 112 can also include the amount of freight (for example, pallets, orders, or goods) that has been prepared to leave the facility and are pending available containers and/or trailers. Real-time signals 112 can include labor signals such as the availability of laborers, the expected/predicted labor schedule for the laborers, and the availability of laborer man-hours.

Some real-time signals 112 can relate to lane activity related to the interaction between two particular facilities, namely the movement of resources across the route between two particular facilities. For example, real-time signals 112 can include information regarding resource movement across a lane between a facility M and a facility N. Real-time signals 112 can include the number of empty trailers that move from facility M to facility N and vice versa. Real-time signals 112 can include the number of overall trailers that move from facility M to facility N and vice versa. Real-time signals 112 can include the number of overall containers that move from facility M to facility N and vice versa. Real-time signals 112 can include the number of trucks that move without trailers and containers from facility M to facility N and vice versa. Movement of resources between facilities is described in more detail in relation to FIG. 2.

In some examples, the self-correction model 110 can be a gradient-boosting tree based machine learning model. The self-correction model 110 can calculate the total error and/or generate the adjusted resource imbalances 114 by using a gradient-boosting tree based machine learning model. The self-correction model 110 can be trained on a variety of information including forecast inputs (for example, forecast inputs 102), real-time signals (for example, real-time signals 112), historical errors, and historical data (for example, historical data 108). In some examples, the self-correction model 110 can be trained on previous weeks or months of forecast data. Forecast data can include the planned resources and volume forecasts for the previous weeks or months. The forecast data can also include the historical data for actual resource imbalances at facilities for the previous weeks or months. The self-correction model 110 can be trained on the previous weeks or months of forecast data. In some examples, the self-correction model 110 can be trained on the previous two weeks of forecast data. In some examples, the forecast model 104 can be trained on the previous two weeks of forecast data excluding the most recent 48 hours. The forecast data can also include recently generated predicted resource imbalances 106. In some examples, the forecast data includes only one predicted resources imbalances 106, namely the most recently generated predicted resource imbalances. In some examples, the forecast data includes multiple predicted resources imbalances 106, for example the multiple predicted resources imbalances generated for a last time such as the previous seven days or previous fourteen days. In some examples, the self-correction model 110 can be trained on a shorter time period of forecast data than the forecast model 104. In some examples, the self-correction model 110 can be trained on a subset of forecast data used to train the forecast model 104. In some examples, the self-correction model 110 can be trained on the historical errors of previous predictions. In some examples, the self-correction model can be trained on previous real-time signals that were used as inputs during a previous generation of adjusted resource imbalances 114.

The adjusted resource imbalances 114 generated by the self-correction model 110 can also be used as feedback for the forecast model 104. The forecast model 104 can retrain based on comparing the adjusted resources imbalances 114 to the predicted resource imbalances 106.

The resource rebalancing module 116 can automatically determine resource allocation for each facility based on the adjusted resource imbalances 114. For example, empty resource imbalances can be used to determine where there might be shortages of resources and what resources need to be provided to which facilities at which times. Likewise, total resource imbalances can be used to determine facilities that have extra resources that can be moved to other facilities.

Based on the resource allocation, the resource rebalancing module 116 can generate resource rebalancing instructions 118. The resource rebalancing module 116 can automatically determine how resources need to be reallocated such that each facility has sufficient resources. The resource rebalancing module 116 can determine what resources need to be moved and how they should be moved. For example, in relation to trailers there are at least four types of movements: moving a truck with an empty trailer (empty meaning the trailer is not currently holding a container), cancelling the movement of a truck with an empty trailer, moving a truck without a trailer (also referred to as a bobtail), cancelling the movement of a truck without a trailer (also referred to as a reverse bobtail). In the example of trailers, the resource rebalancing module 116 can determine what types of movements are needed in order to get the right number of trailers, containers, and trucks at the facilities at the correct times. In some examples, moving a truck with an empty trailer is the least efficient type of movement due to costs of moving the trailer. As such, the resource rebalancing module 116 can maximize the use of the other types of movements, namely cancelling the movement of a truck with an empty trailer, moving a truck without a trailer, and cancelling the movement of a truck without a trailer to minimize the use of moving a truck with an empty trailer. In some examples, trailers are a premium resource such that the resource rebalancing module 116 is primarily focused on optimizing the allocation of trailers rather than the allocation of trucks or containers.

The resource rebalancing module 116 can also determine the movement of goods based on the adjusted resource imbalances 114. In some examples, goods or packages of goods (such as pallets) can also be resources which may need to be balanced across the network of facilities. For example, the resource rebalancing module 116 can determine when goods can be loaded or unloaded into containers. Similarly, the resource rebalancing module 116 can generate goods-related instructions that can also be sent to user devices. Goods-related instructions can instruct users at facilities to load and/or unload goods or prepare goods for loading and/or unloading.

Figure 2:
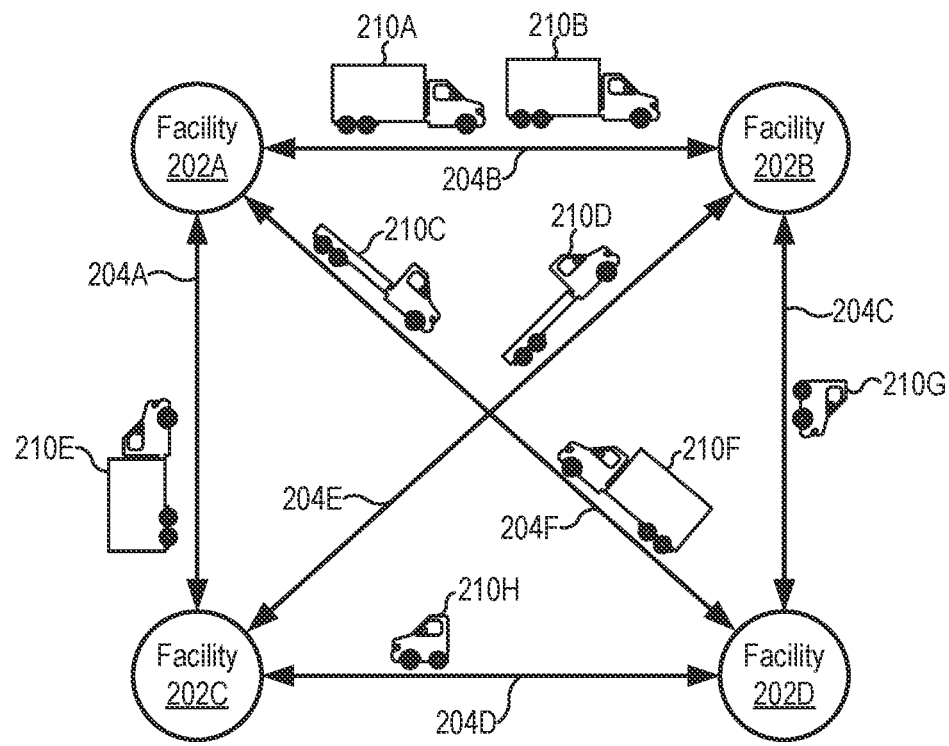
FIG. 2 illustrates a block diagram of resources moving between facilities, according to an embodiment of the present disclosure.

FIG. 2 illustrates a diagram 200 of example movements between facilities. Routes 204A, 204B, 204C, 204D, 204E, 204F connect facilities 202A, 202B, 202C, 202D. Trucks travel along the routes 204A, 204B, 204C, 204D, 204E, 204F to move resources between the facilities 202A, 202B, 202C, 202D. As described herein, resources can include trailers, containers, and trucks themselves. Container-loaded trucks 210A, 210B, 210E, 210F are examples of trucks that have trailers that have containers loaded onto the trailers. Trailer-pulling trucks 210C, 210D are examples of trucks that have trailers, but no containers. Trucks 210G, 210H are examples of trucks that have no trailers and no containers.

As described in relation to FIG. 1, the resource rebalancing module 116 can determine what types of movements are needed to get the proper resource allocation for each facility based on the adjusted resource imbalances 114. Then the resource rebalancing module 116 can generate resource rebalancing instructions. Resource rebalancing instructions can be sent to facilities, trucks, and/or user devices associated with persons managing facilities and/or trucks. The resource rebalancing instructions can indicate whether containers should be unloaded/loaded by certain times and/or containers should be added/removed from trailers at certain times. The resource rebalancing instructions can also indicate whether trucks should travel to facilities to (for example, by adding a new route leg) and whether trucks should be attached to trailers, whether empty trailers or trailers with containers loaded. For example, resource rebalancing module 116 can generate first instructions for facility 202A (or for a manager of facility 202A) that a trailer at facility 202A needs to be prepared to be picked up by truck 210C to be moved to facility 202D. Similarly, the resource rebalancing module 116 can generate instructions for a driver of truck 210C (or a user device of the driver of truck 210C) to go to facility 202A by a first time period to pick up the trailer and take it to facility 202D by a second time period.

By using the adjusted resource imbalances 114, the resource rebalancing module 116 can increase the automation rate for reallocating resources such that less manual intervention is required to provide each facility with enough resources. Thus, the adjusted resource imbalances 114 improve the reallocation of resources across the network facilities for both short-term and long-term time horizons.

Figure 3:
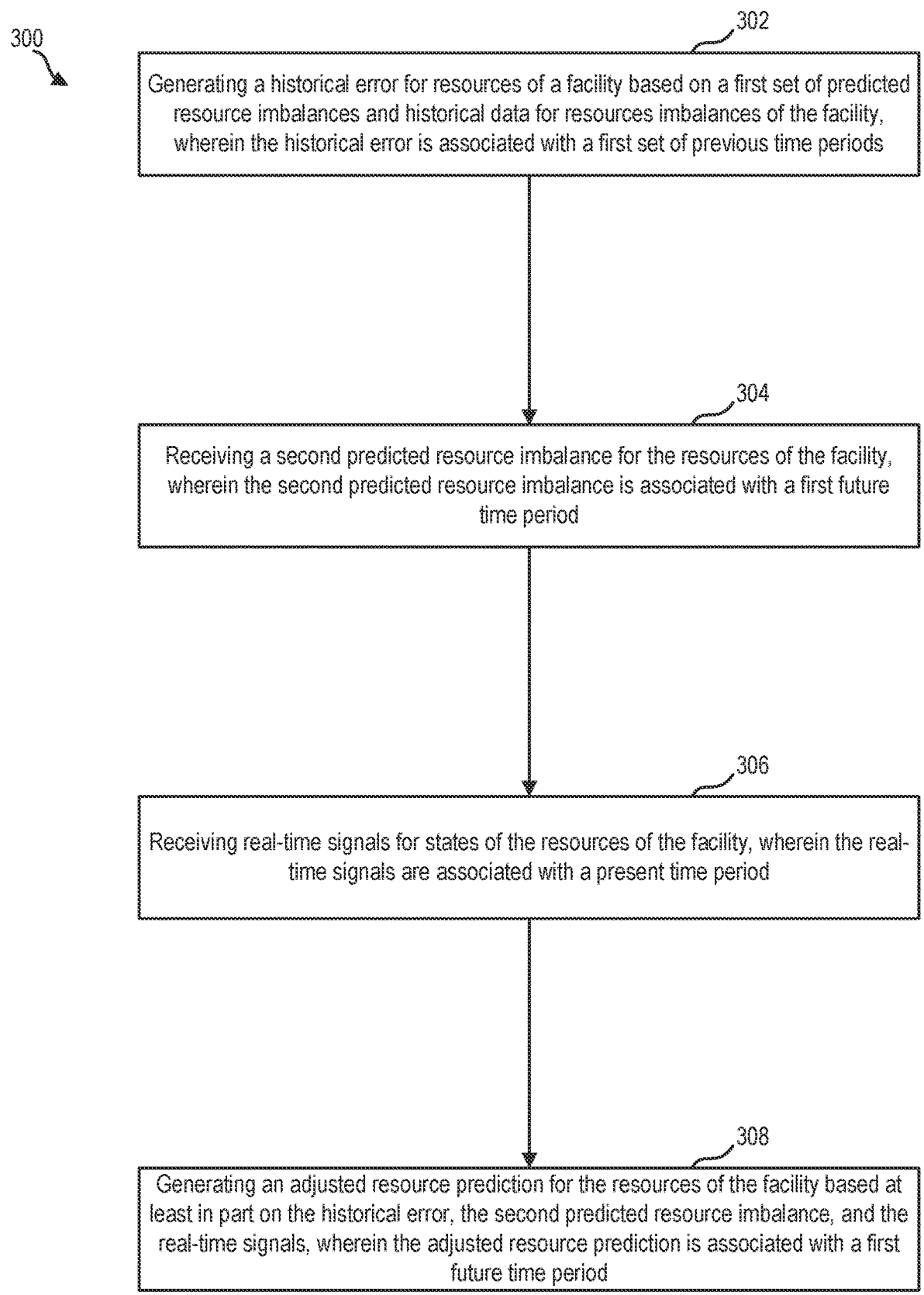
FIG. 3 illustrates a flow diagram for resource allocation, according to an embodiment of the present disclosure.

FIG. 3 illustrates an example process 300 for generating resource rebalancing instructions. The forecast model 104 (FIG. 1), the self-correction model 110 (FIG. 1), and the resource rebalancing module 116 (FIG. 1) embodied in the computer system 502 (FIG. 5) can perform the process 300. The process 300 generates an adjusted resource prediction for the resources of a facility at a future time period based at least in part on historical error, a predicted resource imbalance, and real-time signals from the facility as described further in relation to FIG. 1.

Some or all of the process 300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At block 302, a second model (for example, the self-correction model 110 of FIG. 1) can generate a historical error for resources of a facility based on a first set of predicted resource imbalances and historical data for resources imbalances of the facility. The second model can be a gradient-boosting tree based machine learning model that can be configured to generate an adjusted resource prediction. The historical error can be associated with a first set of previous time periods. In some examples, the resources of the facility can include equipment comprising at least one of: trucks, trailers, and containers.

In some examples, the first set of predicted resource imbalances for the resources of a facility of the facility network can be generated by a first model (for example, the forecast model 104 of FIG. 1). The first set of predicted resources imbalances can be sent by the first model and received by the second model. The first model can be a gradient-boosting tree based machine learning model configured to generate resource predictions. The first set of predicted resource imbalances can also be associated with a first set of previous time periods.

In some examples, the second model can receive historical data for resources imbalances of the facility. The historical data can be associated with the first set of previous time periods. The historical data can represent the actual resource imbalances at the facility during particular previous time periods.

At block 304, the self-correction model can receive a second predicted resource imbalance for the resources of the facility. The second predicted resource imbalance can be associated with a first future time period. The second predicted resource imbalance can include a second predicted total resource imbalance and a second predicted empty resource imbalance for the first future time period. In some examples, the second predicted resource imbalance can be generated based at least in part on at least one of: a facility type, time of day information, day of week information, week of year information, and location of facility information. In some examples, the second predicted resource imbalance can be generated based on a second set of previous time periods, and wherein the first set of previous time periods (used for example in relation to the first set of predicted resource imbalances and the historical data) is a subset of the second set of previous time periods.

In some examples, the first model can adjust the second predicted resource imbalance based on bias correction for the facility. In some examples, the first model can adjust the second predicted resource imbalance based on network level resource movement across a network of facilities, wherein the network includes the facility.

In some examples, the first model can be retrained based on the adjusted resource prediction, wherein the first model is configured to generate the first set of predicted resource imbalances and the second predicted resource imbalance.

At block 306, the self-correction model can receive real-time signals for states of the resources of the facility. The real-time signals can be associated with a present time period. The real-time signals can include an empty resource count. Real-time signals can relate to one or more of containers, trailers, trucks, labor signals, and lane activity between two particular facilities.

At block 308, the self-correction model can generate an adjusted resource prediction for the resources of the facility based at least in part on the historical error, the second predicted resource imbalance, and the real-time signals. The adjusted resource prediction can be associated with a first future time period. The adjusted resource prediction can include an adjusted predicted total resource imbalance and an adjusted predicted empty resource imbalance for the first future time period.

In some examples, the adjusted resource prediction can be further associated with a first set of future time periods including the first future time period. The first set of future time periods can include time periods having an hourly granularity for a first length of time after a generation time associated with the adjusted resource prediction. For example, the first length of time may be two days after the generation time associated with the adjusted resource prediction. The first set of future time periods can include time periods having a daily granularity for a second length of time after the first length of time. For example, the second length of time can be nineteen days after the two days of the first length of time.

In some examples, the second model can send the adjusted resource prediction to the resource rebalancing module. In some examples, the resource rebalancing module can generate resource rebalancing instructions based at least in part on the adjusted resource prediction. In some examples, generating the resource rebalancing instructions can include generating itineraries for movement of at least one of: the trucks, the trailers, and the containers. In some examples, the resource rebalancing module can send the resource rebalancing instructions to user devices associated with facility managers and/or truck drivers.

Figure 4:
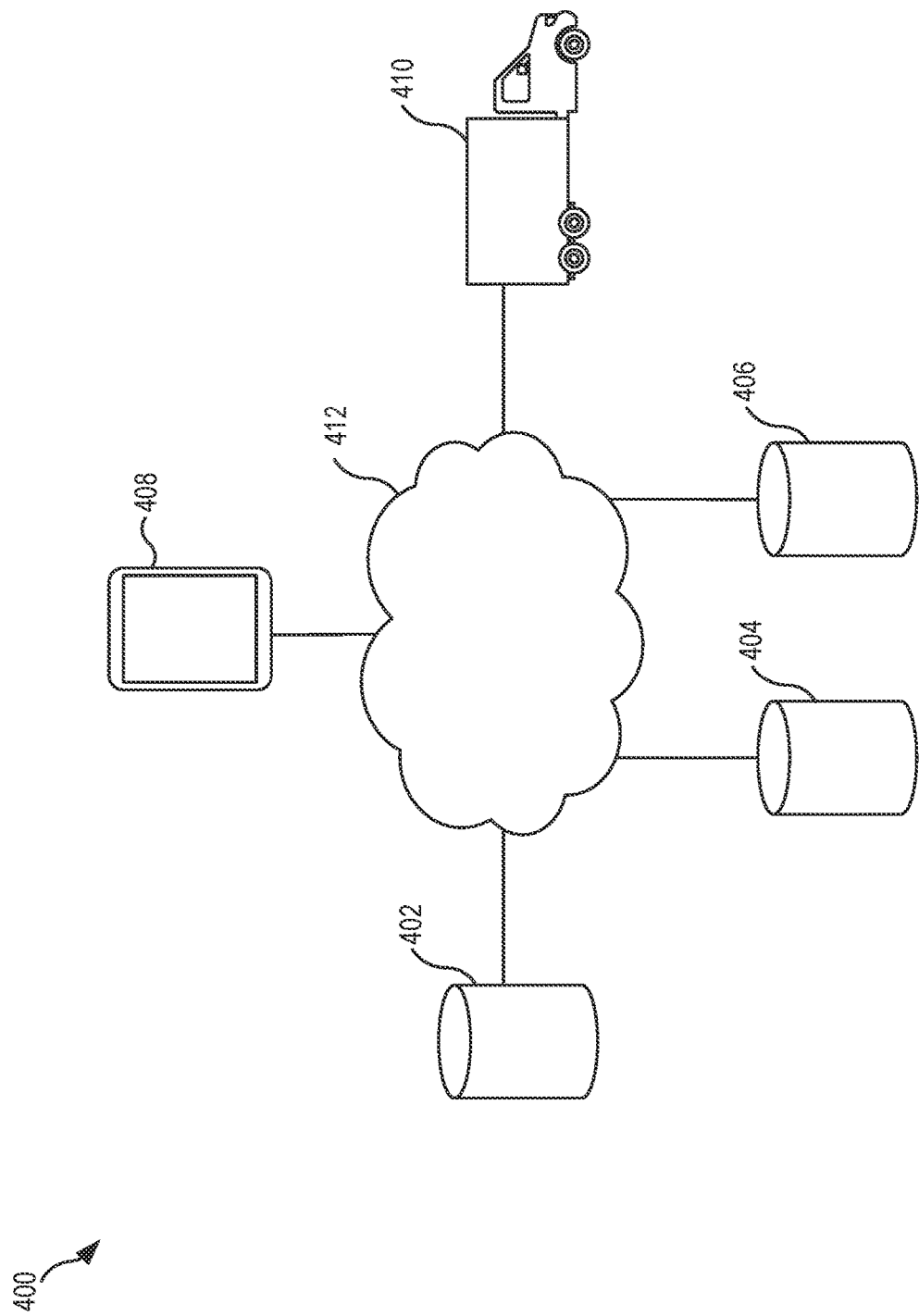
FIG. 4 illustrates a block diagram for resource management, according to an embodiment of the present disclosure.

FIG. 4 illustrates a block diagram 400 of resource reallocation techniques described herein. A forecast model (for example, the forecast model 104 of FIG. 1) for generating predicted resource imbalances (for example, predicted resource imbalances 106 of FIG. 1) can be hosted on one or more application servers, for example a first application server 402. The forecast model can be referred to as a resource imbalance prediction model or a resource availability forecast model. A self-correction model for generating adjusted resource imbalances (for example, the adjusted resource imbalances 114 of FIG. 1) by performing error correction on the predicted resource imbalances of the forecast model can be used. The self-correction model can be hosted on one or more application servers, for example a second application server 404. In some examples, the self-correction model can be hosted on the same one or more application servers as the forecast model, for example the first application server 402. The adjusted resource imbalances of the self-correction model can be used by a resource rebalancing module (for example, the resource rebalancing module 116 of FIG. 1) to determine resource reallocation and generate resource rebalancing instructions (for example, the resource rebalancing instructions 118 of FIG. 1). The resource rebalancing module can be hosted on one or more application servers, for example a third application server 406. In some examples, the self-correction model can be hosted on the same one or more application servers as the forecast model and/or the same one or more application servers of the self-correction model, for example the first application server 402 and/or the second application server 404. The first application server 402, the second application server 404, and the third application server can be connected through a network 412. The network 412 can be any kind of network. For example, the network 412 can be a local area network (LAN) or a wide area network (WAN), or a combination (for example, the internet). The resource rebalancing module can send the resource rebalancing instructions to one or more user devices, such as user device 408, and/or one or more trucks, such as truck 410. The resource rebalancing instructions can be used by a user interface on the user device 408 and/or truck 410 to present resource rebalancing information to users associated with the user device 408 and/or truck 410, for example a driver of the truck 410 or a manager of a facility.

FIG. 5 illustrates an example schematic architecture 500 for implementing techniques relating resource allocation, according to at least one example. The architecture 500 may include a computer system 502 (e.g., the computer system described herein) in communication with one or more user devices 504(1)-504(N) via one or more networks 508 (hereinafter, "the network 508").

The computer system 502 may include one or more computer system computers, perhaps arranged in a cluster of servers or as a server farm, and may host web service applications. The function of the computer system 502 may be implemented a cloud-based environment such that individual components of the computer system 502 are virtual resources in a distributed environment.

The computer system 502 may include at least one memory 520 and one or more processing units (or processor(s)) 522. The processor 522 may be implemented as appropriate in hardware, computer-executable instructions, software, firmware, or combinations thereof. Computer-executable instruction, software, or firmware implementations of the processor 522 may include computer-executable or machine-executable instructions written in any suitable programming language to perform the various functions described. The memory 520 may include more than one memory and may be distributed throughout the computer system 502. The memory 520 may store program instructions that are loadable and executable on the processor(s) 522, as well as data generated during the execution of these programs. Depending on the configuration and type of memory including the computer system 502, the memory 520 may be volatile (such as RAM and/or non-volatile (such as read-only memory ("ROM"), flash memory, or other memory)). The memory 520 may include an operating system 524 and one or more application programs, modules, or services for implementing the features disclosed herein including at least a forecast model 534, a self-correction model 536, and a version of the resource rebalancing module 538 (e.g., 538(1)). For example, the resource rebalancing module 538(1) may perform the resource allocation functionality described herein in relation to FIGS. 1-4.

The forecast model 534 (for example, the forecast model 104 of FIG. 1) can generate predicted resource imbalances (for example, the predicted resource imbalances 106 of FIG. 1). In an example, the forecast model 534 can ingest forecast inputs (for example, the forecast inputs 102 of FIG. 1) and can generate the predicted resource imbalances at a facility in a facility network as described herein. The forecast model 534 can bias correct the predicted resource imbalances at a facility-level and at a network-level. The forecast model 534 can send the predicted resource imbalances to a self-correction model 536.

The self-correction model 536 (for example, the self-correction model 110 of FIG. 1) can generate adjusted resource imbalances (for example, the adjusted resource imbalances 114 of FIG. 1). In an example, the self-correction model 536 can ingest predicted resource imbalances from the forecast model 534 and historical data (for example, the historical data 108 of FIG. 1) and can generate historic errors and/or historic total errors regarding the predicted resource imbalances at a facility in a facility network as described herein. The self-correction model 536 can also ingest real-time signals (for example, the real-time signals 112 of FIG. 1) which indicate resource information at the facility for a present time period. The self-correction model 536 can generate adjusted resource imbalances based on the historic total errors and the real-time signals. The self-correction model 536 can send the adjusted resource imbalances to the resource rebalancing module 538(1).

The resource rebalancing module 538(1) (for example, the resource rebalancing module 116 of FIG. 1) can generate resource rebalancing instructions (for example, the resource rebalancing instructions 118 of FIG. 1). The resource rebalancing module 538(1) can determine how resources should be reallocated based on the adjusted resource imbalances as described herein. The resource rebalancing module 538(1) can generate resource rebalancing instructions to send to the resource rebalancing module 538(2) of user device 504 such that a user 506 (for example, a facility manager or a truck driver, among others) associated with user device 504 can receive the resource rebalancing instructions.

The computer system 502 may also include additional storage 528, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 528, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 502 and/or part of the user device 504.

The computer system 502 may also include input/output (I/O) device(s) and/or ports 830, such as for enabling connection with a keyboard, a mouse, a pen, a voice input device, a touch input device, a display, speakers, a printer, or other I/O device.

In some examples, the computer system 502 may also include one or more user interface(s) 532. The user interface 532 may be utilized by an operator, curator, or other authorized user to access portions of the computer system 502. In some examples, the user interface 532 may include a graphical user interface, voice interfaces, web-based applications, programmatic interfaces such as APIs, or other user interface configurations.

The computer system 502 may also include a data store 501. In some examples, the data store 501 may include one or more databases, data structures, or the like for storing and/or retaining information associated with the computer system 502 and which, in some examples, may be accessible by the user devices 504. The forecast model 534, the self-correction model 536, and the resource rebalancing module 538(1) are communicatively coupled (e.g., via a wired connection or a wireless connection) to the data store 501. The data store 501 includes a library of data including the forecast inputs 542 (for example, the forecast inputs 102 of FIG. 1). In an example, the data store 501 can include any other suitable data, databases, libraries, and the like.

Turning now to the details of the user device 504, the user device 504 may be operable by one or more users 506 to interact with the computer system 502. The users 506 may be administrators, developers, truck drivers, or others that desire to receive resource rebalancing instructions (for example, the resource rebalancing instructions 118 of FIG. 1). The user device 504 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, etc. For example, the user device 504(1) is illustrated as a desktop computer, while the user device 504(N) is illustrated as an example of a handheld mobile device.

The user device 504 may include a memory 514 and processor(s) 516. In the memory 514 may be stored program instructions that are loadable and executable on the processor(s) 516, as well as data generated during the execution of these programs. Depending on the configuration and type of user device 504, the memory 514 may be volatile (such as random access memory ("RAM")) and/or non-volatile (such as read-only memory (ROM), flash memory, etc.).

In some examples, the memory 514 may include a web service application 512 and a version of a resource rebalancing module 538 (e.g., 538(2)). The web service application 512 and/or resource rebalancing module 538(2) may allow the user 506 to receive resource rebalancing instructions from the computer system 502 via the network 508. The user device 504 may also include one or more interfaces 518 to enable communication with other devices, systems, and the like.

Figure 6:
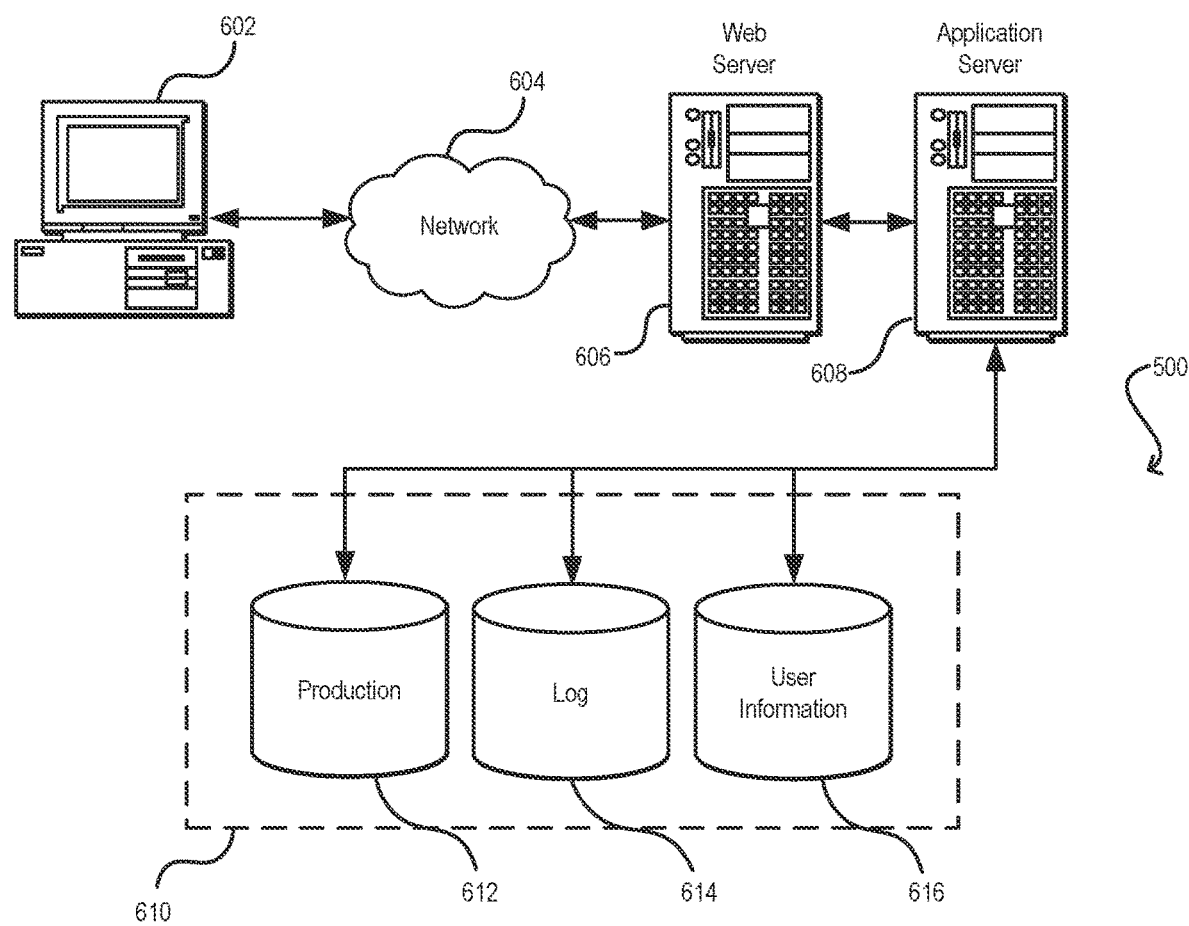
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system, comprising:
   one or more processors; and
   one or more memory storing instructions that, upon execution by the one or more processors, configure the computer system to:
   generate a historical error for resources of a facility based on a first set of predicted resource imbalances and historical data for resources imbalances of the facility, wherein the historical error is associated with a first set of previous time periods;
   receive a second predicted resource imbalance for the resources of the facility, wherein the second predicted resource imbalance is associated with a first future time period;
   receive real-time signals for states of the resources of the facility, wherein the real-time signals are associated with a present time period;
   generate an adjusted resource prediction for the resources of the facility based at least in part on the historical error, the second predicted resource imbalance, and the real-time signals, wherein the adjusted resource prediction is associated with a first future time period; and
   generate resource rebalancing instructions based at least in part on the adjusted resource prediction.

2. The computer system of claim 1, wherein the second predicted resource imbalance is generated based at least in part on at least one of: a facility type, time of day information, day of week information, week of year information, and location of facility information.

3. The computer system of claim 1, wherein the second predicted resource imbalance is generated based on a second set of previous time periods, and wherein the first set of previous time periods is a subset of the second set of previous time periods.

4. The computer system of claim 1, wherein the resources include equipment comprising at least one of: trucks, trailers, and containers.

5. A computer-implemented method, comprising:
   generating a historical error for resources of a facility based on a first set of predicted resource imbalances and historical data for resources imbalances of the facility, wherein the historical error is associated with a first set of previous time periods;
   receiving a second predicted resource imbalance for the resources of the facility, wherein the second predicted resource imbalance is associated with a first future time period;
   receiving real-time signals for states of the resources of the facility, wherein the real-time signals are associated with a present time period;
   generating an adjusted resource prediction for the resources of the facility based at least in part on the historical error, the second predicted resource imbalance, and the real-time signals, wherein the adjusted resource prediction is associated with a first future time period; and
   generating resource rebalancing instructions based at least in part on the adjusted resource prediction.

6. The computer-implemented method of claim 5, wherein the resources include equipment comprising at least one of: trucks, trailers, and containers.

7. The computer-implemented method of claim 6, wherein generating the resource rebalancing instructions includes generating itineraries for movement of at least one of: the trucks, the trailers, and the containers.

8. The computer-implemented method of claim 5, further comprising generating the second predicted resource imbalance based on a second set of previous time periods, and wherein the first set of previous time periods is a subset of the second set of previous time periods.

9. The computer-implemented method of claim 5, further comprising generating the first set of predicted resource imbalances and the second predicted resource imbalance by a first model, wherein the first model is a gradient-boosting tree based machine learning model configured to generate resource predictions.

10. The computer-implemented method of claim 9, wherein generating the adjusted resource prediction is performed by a second model, wherein the second model is a gradient-boosting tree based machine learning model configured to generate the adjusted resource prediction from the resource predictions of the first model.

11. The computer-implemented method of claim 5, wherein the second predicted resource imbalance is generated based at least in part on at least one of: a facility type, time of day information, day of week information, week of year information, and location of facility information.

12. The computer-implemented method of claim 5, wherein the adjusted resource prediction is further associated with a first set of future time periods including the first future time period, wherein the first set of future time periods includes time periods having an hourly granularity for a first length of time after a generation time associated with the adjusted resource prediction.

13. The computer-implemented method of claim 12, wherein the first set of future time periods includes time periods having a daily granularity for a second length of time after the first length of time.

14. One or more non-transitory computer-readable media comprising computer-executable instructions that, when executed by one or more processors of a computer system, cause the computer system to perform operations comprising:
    generating a historical error for resources of a facility based on a first set of predicted resource imbalances and historical data for resources imbalances of the facility, wherein the historical error is associated with a first set of previous time periods;
    receiving a second predicted resource imbalance for the resources of the facility, wherein the second predicted resource imbalance is associated with a first future time period;
    receiving real-time signals for states of the resources of the facility, wherein the real-time signals are associated with a present time period;
    generating an adjusted resource prediction for the resources of the facility based at least in part on the historical error, the second predicted resource imbalance, and the real-time signals, wherein the adjusted resource prediction is associated with a first future time period; and
    generating resource rebalancing instructions based at least in part on the adjusted resource prediction.

15. The one or more non-transitory computer-readable media of claim 14, wherein the computer-readable media comprise additional instructions that, when executed by the one or more processors, cause the computer system to perform additional operations comprising:
    receiving the first set of predicted resource imbalances for the resources of a facility, wherein the first set of predicted resource imbalances is associated with the first set of previous time periods; and
    receiving historical data for resources imbalances of the facility, wherein the historical data is associated with the first set of previous time periods.

16. The one or more non-transitory computer-readable media of claim 14, wherein the computer-readable media comprise additional instructions that, when executed by the one or more processors, cause the computer system to perform additional operations comprising: adjusting the second predicted resource imbalance based on bias correction for the facility.

17. The one or more non-transitory computer-readable media of claim 16, wherein the computer-readable media comprise additional instructions that, when executed by the one or more processors, cause the computer system to perform additional operations comprising adjusting the second predicted resource imbalance based on network level resource movement across a network of facilities, wherein the network includes the facility.

18. The one or more non-transitory computer-readable media of claim 14, wherein the computer-readable media comprise additional instructions that, when executed by the one or more processors, cause the computer system to perform additional operations comprising retraining a first model based on the adjusted resource prediction, wherein the first model is configured to generate the first set of predicted resource imbalances and the second predicted resource imbalance.

19. The one or more non-transitory computer-readable media of claim 14, wherein the second predicted resource imbalance is generated based on a second set of previous time periods, and wherein the first set of previous time periods is a subset of the second set of previous time periods.

20. The one or more non-transitory computer-readable media of claim 19, wherein the second set of previous time periods includes time periods of hourly granularity for a previous two weeks prior to a generation of the second predicted resource imbalance.

\* \* \* \* \*